(12) United States Patent
Johnson

(10) Patent No.: US 11,007,458 B2
(45) Date of Patent: May 18, 2021

(54) ALL-GRAVITY MULTI-PHASE FLUID SEPARATION SYSTEM

(71) Applicant: EnXL LLC, Midland, TX (US)

(72) Inventor: Bruce D. Johnson, Midland, TX (US)

(73) Assignee: EnXL LLC, Midland, TX (US)

( * ) Notice: Subject to any disclaimer, the term of this patent is extended or adjusted under 35 U.S.C. 154(b) by 0 days.

(21) Appl. No.: 16/599,024

(22) Filed: Oct. 10, 2019

(65) Prior Publication Data

US 2020/0114282 A1  Apr. 16, 2020

Related U.S. Application Data

(60) Provisional application No. 62/743,984, filed on Oct. 10, 2018.

(51) Int. Cl.
| | |
|---|---|
| *B01D 21/00* | (2006.01) |
| *B01D 21/02* | (2006.01) |
| *B01D 19/00* | (2006.01) |
| *B01D 21/24* | (2006.01) |
| *B01D 21/34* | (2006.01) |

(52) U.S. Cl.
CPC ..... *B01D 21/0087* (2013.01); *B01D 19/0042* (2013.01); *B01D 19/0068* (2013.01); *B01D 21/02* (2013.01); *B01D 21/2405* (2013.01); *B01D 21/2444* (2013.01)

(58) Field of Classification Search
CPC .... B01D 21/265; B01D 21/245; B01D 21/10; B01D 21/2416; B01D 21/2444; B01D 21/02; B01D 21/0087; B01D 19/0068; B01D 21/2405; B01D 19/0042; B01D 21/34; B01D 21/2494

USPC .............................................. 210/512.1, 801
See application file for complete search history.

(56) References Cited

U.S. PATENT DOCUMENTS

| | | | |
|---|---|---|---|
| 2,307,154 A | 1/1943 | Osuna | |
| 2,701,620 A * | 2/1955 | Crawford ................ | E21B 43/34 96/159 |
| 3,273,318 A * | 9/1966 | Meyer ..................... | E21B 43/34 96/185 |
| 3,397,788 A | 8/1968 | Duff et al. | |
| 3,884,803 A | 5/1975 | Traylor | |
| 3,951,806 A | 4/1976 | Young | |
| 3,965,013 A | 6/1976 | Jackson | |

(Continued)

*Primary Examiner* — Nam X Nguyen
*Assistant Examiner* — Ekandra S. Miller-Cruz
(74) *Attorney, Agent, or Firm* — Polsinelli PC

(57) ABSTRACT

A separation system for separating the components of a multi-phase fluid includes at least three tanks coupled together in series, with each tank enclosing a column of multi-phase fluid and having a tubular center riser that is divided into a distribution section and a gathering section, and with each center riser being configured to established a fluid circulation pattern having a radially-outward travel first leg, a vertical travel second leg, and a radially-inward travel third leg within the corresponding column of multi-phase fluid that is configured to separate at least one of a gas component, an oil component, and a particulate matter component from a water component of the multi-phase fluid, and with the height of the columns of multi-phase fluid in the first tank and the second tank being substantially equal to each other and determined by the height of a pour-over opening in the center riser of the third tank.

18 Claims, 9 Drawing Sheets

(56) References Cited

U.S. PATENT DOCUMENTS

| | | | |
|---|---|---|---|
| 4,014,791 A * | 3/1977 | Tuttle | B01D 17/0214 210/114 |
| 4,120,795 A * | 10/1978 | Laval, Jr. | B01D 17/0217 209/729 |
| 4,297,221 A | 10/1981 | Moll et al. | |
| 4,517,091 A | 5/1985 | Yamanaka et al. | |
| 4,608,160 A | 8/1986 | Zoch | |
| 4,816,156 A | 3/1989 | Brombach et al. | |
| 4,820,427 A | 4/1989 | Ryynanen | |
| 4,987,922 A * | 1/1991 | Andrepont | B67D 7/78 137/592 |
| 5,073,266 A * | 12/1991 | Ball, IV | B01D 17/0217 210/519 |
| 5,176,161 A * | 1/1993 | Peters | F28D 20/0039 137/15.08 |
| 5,197,513 A * | 3/1993 | Todd | B67D 3/0022 137/592 |
| 5,518,617 A | 5/1996 | Timmons | |
| 5,695,643 A | 12/1997 | Brandt et al. | |
| 6,214,092 B1 | 4/2001 | Odom et al. | |
| 6,426,005 B1 | 7/2002 | Larsson | |
| 6,875,351 B2 * | 4/2005 | Arnaud | B01D 21/2433 210/170.01 |
| 7,077,201 B2 | 7/2006 | Heins | |
| 7,520,993 B1 | 4/2009 | Laraway et al. | |
| 7,815,804 B2 | 10/2010 | Nagghappan | |
| 7,824,552 B2 | 11/2010 | Slabaugh et al. | |
| 8,097,163 B1 | 1/2012 | Stewart et al. | |
| 8,496,740 B1 * | 7/2013 | Ball, IV | B01D 17/0208 96/183 |
| 8,535,538 B1 | 9/2013 | Keeling et al. | |
| 8,715,498 B2 | 5/2014 | Bly, Jr. et al. | |
| 8,834,726 B2 | 9/2014 | Keister | |
| 9,656,894 B2 | 5/2017 | Snydmiller et al. | |
| 2003/0168410 A1 | 9/2003 | Robicheaux et al. | |
| 2006/0283805 A1 | 12/2006 | Schreppel, Jr. | |
| 2010/0133196 A1 | 6/2010 | Khudenko | |
| 2010/0180768 A1 * | 7/2010 | Folkvang | B04C 5/103 95/253 |
| 2010/0294719 A1 | 11/2010 | Polizzotti et al. | |
| 2014/0275690 A1 * | 9/2014 | Hernandez | B01D 17/0217 585/800 |
| 2016/0355408 A1 | 12/2016 | Betts | |

\* cited by examiner

ALL-GRAVITY MULTI-PHASE FLUID SEPARATION SYSTEM

CROSS-REFERENCE TO RELATED APPLICATIONS

This application claims the benefit of U.S. Provisional Application No. 62/743,984, filed Oct. 10, 2018, which is incorporated by reference in its entirety herein, and for all purposes.

FIELD OF THE INVENTION

The present invention generally relates to water clarification systems, and more specifically to water clarification systems used in water processing facilities that receive contaminated water from hydrocarbon-producing wells.

SUMMARY

Briefly described, one embodiment of the present disclosure comprises a separation system for separating the components of a multi-phase fluid. The separation system includes at least three enclosed tanks that are coupled together in series, with each tank enclosing a column of multi-phase fluid. Each tank also includes a tubular riser centered within its column of multi-phase fluid that is divided into a distribution section and a gathering section. Each of the tubular center risers is further configured to established a fluid circulation pattern having a radially-outward travel first leg, a vertical travel second leg, and a radially-inward travel third leg within the corresponding column of multi-phase fluid that is configured to separate at least one of a gas component, an oil component, and a particulate matter component from a water component of the multi-phase fluid. Additionally, the height of the columns of multi-phase fluid in the first tank and the second tank are substantially equal to each other and determined by the height of a pour-over opening in the tubular center riser of the third tank.

DETAILED DESCRIPTION

The following description, in conjunction with the accompanying drawings, is provided as an enabling teaching of exemplary embodiments of an all-gravity separation or water clarification system for a multi-phase fluid that is useful in salt water disposal (SWD) facilities or other water processing facilities that receive contaminated water from one or more hydrocarbon-producing wells. The disclosure further includes one or more methods for separating and/or clarifying the components of a mixed or multi-phase flow of fluids. As described below, the system and methods can provide several significant advantages and benefits over other systems and methods for separating or clarifying the components of a mixed or multi-phase flow of fluids currently available in the art. However, the recited advantages are not meant to be limiting in any way, as one skilled in the art will appreciate that other advantages may also be realized upon practicing the present disclosure. It will be appreciated, moreover, that other applications for the disclosed multi-phase fluid separation system, in addition to the clarification of produced oily water from hydrocarbon production wells, are also possible and considered to fall within the scope of the present disclosure.

Furthermore, those skilled in the relevant art will recognize that changes can be made to the described embodiments while still obtaining the beneficial results. It will also be apparent that some of the advantages and benefits of the described embodiments can be obtained by selecting some of the features of the embodiments without utilizing other features, and that features from one embodiment may be combined with features from other embodiments in any appropriate combination. For example, any individual or collective features of method embodiments may be applied to apparatus, product or system embodiments, and vice versa. Accordingly, those who work in the art will recognize that many modifications and adaptations to the embodiments described are possible and may even be desirable in certain circumstances, and are a part of the disclosure. Thus, the present disclosure is provided as an illustration of the principles of the embodiments and not in limitation thereof, since the scope of the invention is to be defined by the claims.

Figure 1:
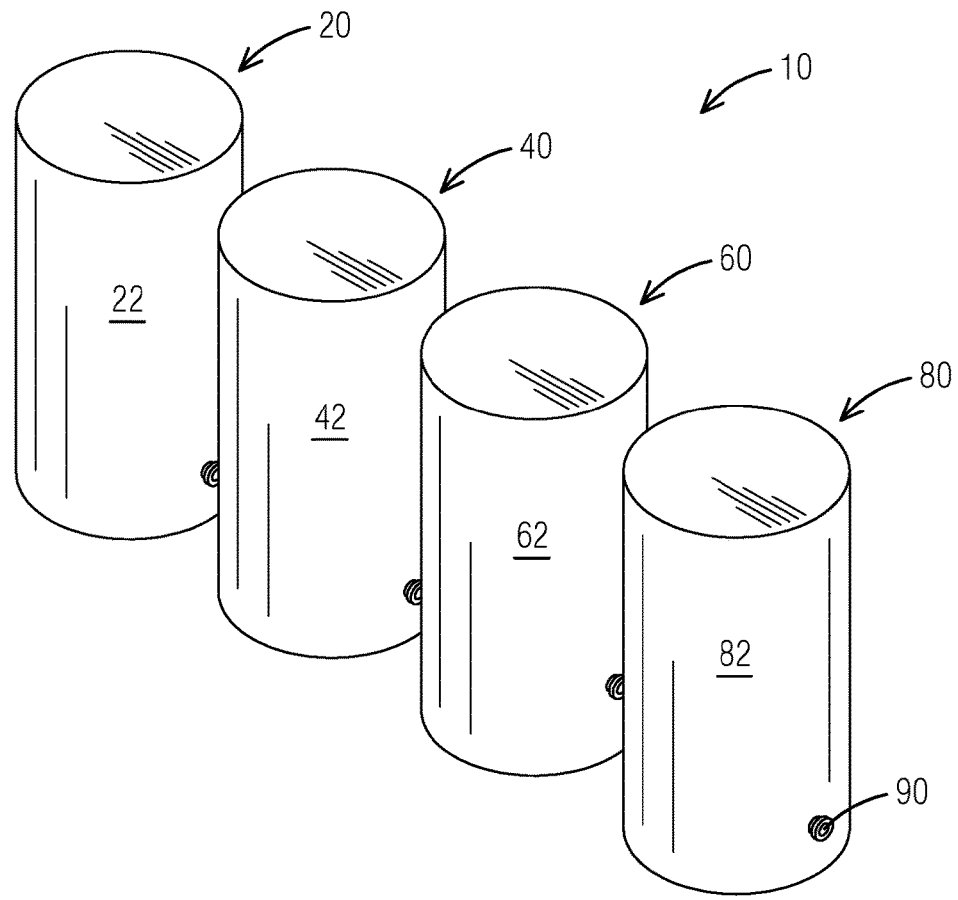
FIG. 1 is an exterior perspective view of an all-gravity separation system for a multi-phase fluid, in accordance with one representative embodiment of the present disclosure.
Figure 2:
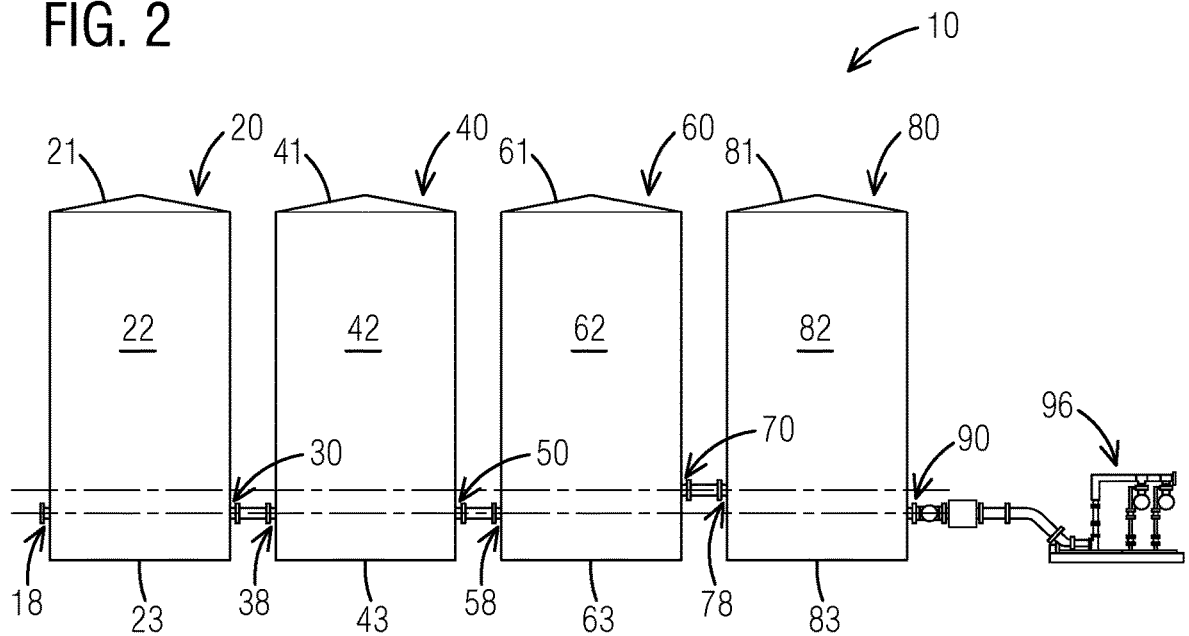
FIG. 2 is an exterior side view of the multi-phase fluid separation system of FIG. 1.

Referring now in more detail to the drawing figures, FIGS. 1-2 illustrate one embodiment of an all-gravity fluid separation or clarification system 10 that is configured to receive a multi-phase fluid, including but not limited to produced fluids from oil production facilities, and separate the individual phases and components of the multi-phase fluid into separate streams of substantially clarified components. The multi-phase fluid can come straight from one or more producing wellheads, or in the alternative may be oily water that is received after passing through an earlier or upstream oil/water separation process. In one representative embodiment an inlet stream of produced multi-phase fluid may comprise a water component greater than or about 95% by volume, an oil component less than or about 5% by volume, a gas component in solution, and a particulate matter component that is less than or about 5% by volume. Upon passing through the separation system 10 of the present disclosure, the same multi-phase fluid will have been separated into an oil outlet stream, a gas outlet stream, discrete accumulations of solids and sludge that can be periodically removed or flushed from the separation system, and a primary clean water outlet stream having less than or about 50 ppm of oil (or under appropriate conditions less than or about 25 ppm of oil), a greatly-reduced amount of gas in solution, and with any entrained particulate matter in suspension being less than or about 200 microns in size.

As can be seen in the drawings, the all-gravity multi-phase fluid separation system 10 generally comprises a series of four enclosed separator tanks 20, 40, 60, 80 that are non-pressurized (i.e. near atmospheric conditions). In one aspect each tank can be about 360" (30') tall with a diameter of about 15½ ft., and having a capacity or volume of about 1000 barrels of liquid. In one embodiment the tanks can be substantially identical in size, as shown, which can provide for a more simplistic, cost-effective construction. Furthermore, as this is a common size of tank in use in the oil and gas industry, this can also allow for the retrofit of existing tanks of equal or similar size. It will nevertheless be appreciated that in other embodiments the tanks of the separation system can differ in size and shape, and that a different number of tanks is also possible, including both a fewer number of tanks (e.g. 2-3), in which case the overall effectiveness of the separator system may be reduced, as well as a greater number of tanks.

In the embodiment of the separation system 10 illustrated in FIGS. 1-2, the individual separator tanks 20, 40, 60, 80 may be connected together in series with large diameter, low flow rate piping (ranging from about 12" to about 18" in diameter), and the overall system may be sized for a design inlet flowrate of about 15,000 BPD of produced multi-phase fluid. Furthermore, the sizing of the separator tanks and connective piping can lead to an overall fluid retention time in the system of about 3 hours in steady-state conditions, thereby providing for a slow flow, low turbulence movement of fluids within and between the individual tanks. The retention time can vary, however, depending on the level control set points within the fourth tank and any inlet surges into the separator system 10. This overall slow flow, low turbulence movement of fluids through the series of separator tanks, together with the controlled circulation patterns with the liquid columns of each tank (described in more detail below), can provide for an improved gravity-based separation of particulate matter and dense fluids (i.e. sludge) together with an improved specific gravity-based separation of the entrained oil component from the water component.

Figure 3:
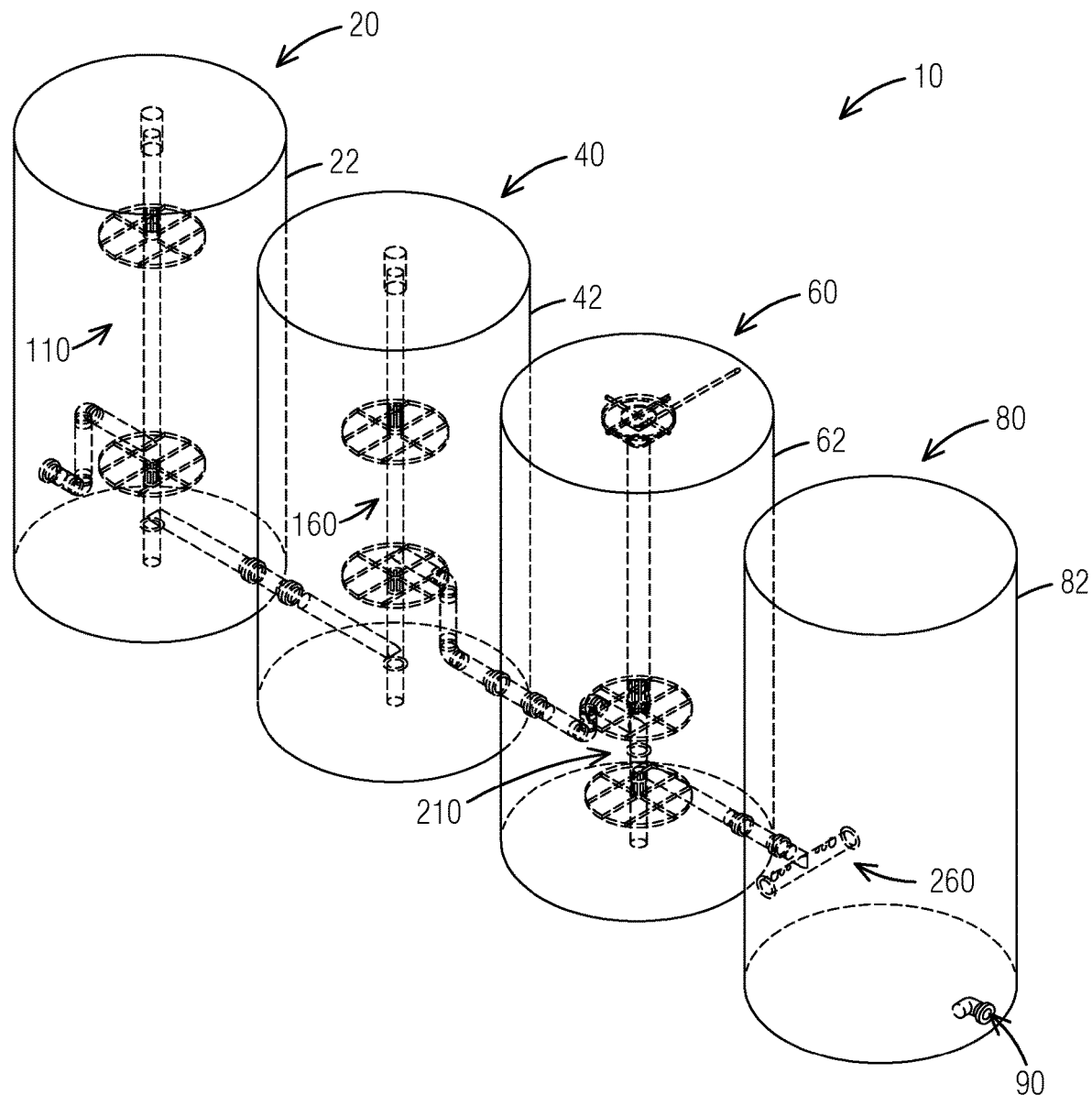
FIG. 3 is a perspective view of the interior of the multi-phase fluid separation system of FIG. 1, showing the internal components within the tanks that comprises the separation system.

FIG. 3 is a perspective view of the interior of the multi-phase fluid separation system 10 showing different sets of internal components 110, 160, 210, 260 within each of the separator tanks 20, 40, 60, 80, respectively, that comprise the separation system 10. For the first tank 20, second tank 40, and third tank 60, for example, these sets of internal components 110, 160, 210 can include center risers with outflow and inflow ports and flow distribution plates, as described in more detail below. In one aspect the third tank 60 can further include a "pour-over" opening, such as a tulip assembly, located at the upper end of the center riser that controls the liquid level in the first and second tanks, also as described below. The fourth and final tank can differ from the other three by replacing the center riser with an inlet diverter located on the opposite side of the tank from a gathering leg.

In some embodiments the tanks 20, 40, 60, 80 can have a steel construction that complies with API (American Petroleum Institute) Standard 12F for shop welded tanks, while in other embodiments the tanks 20, 40, 60, 80 can have a fiberglass construction which complies with API Standard 12P for fiberglass reinforced plastic tanks. The different sets of internal components 110, 160, 210, 260 for both embodiments generally comprise welded steel piping and risers; however, fiberglass internal piping & risers are also possible. In the case of the tanks having a fiberglass construction, the internal risers and additional components, such as fittings, piping brackets, or auxiliary equipment (e.g. oil skimmers), etc., can be cut and glued to the sidewall, top, or base of the fiberglass tanks as needed. It is nevertheless foreseen that other construction materials and fabrication/manufacturing techniques are also possible and considered to fall within the scope of the present disclosure.

Also shown in FIGS. 1-3, the tanks can be aligned in a straight line to form a train. In other aspects the tanks can also be arranged in the four quadrants of a square if desired, such as when land area is limited. It is foreseen that other tank arrangements are also possible and considered to fall within the scope of the present disclosure.

Figure 4:
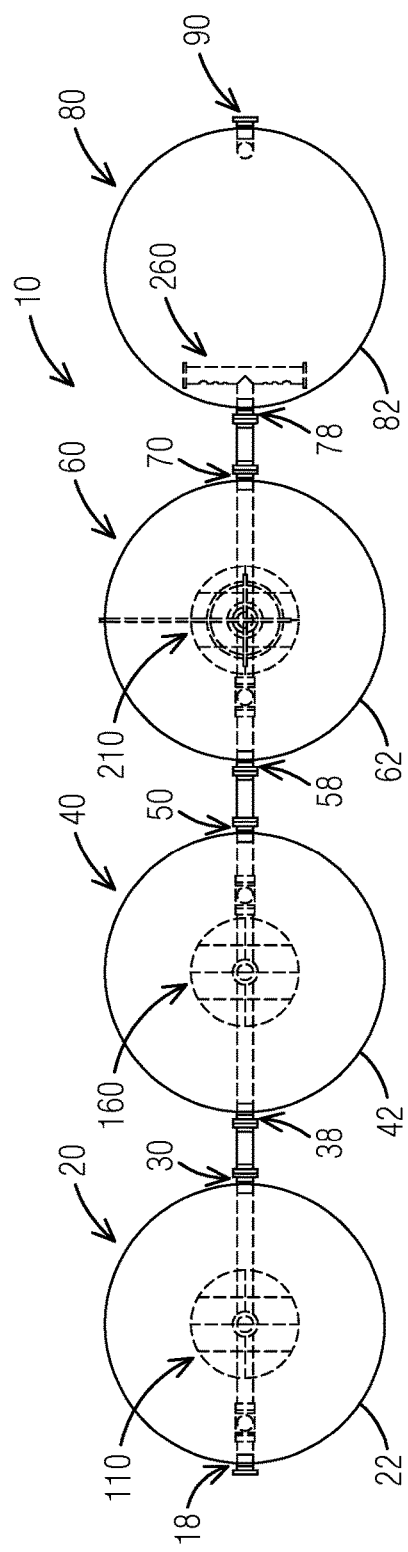
FIG. 4. is a top view of the interior of the multi-phase fluid separation system of FIG. 1.
Figure 5:
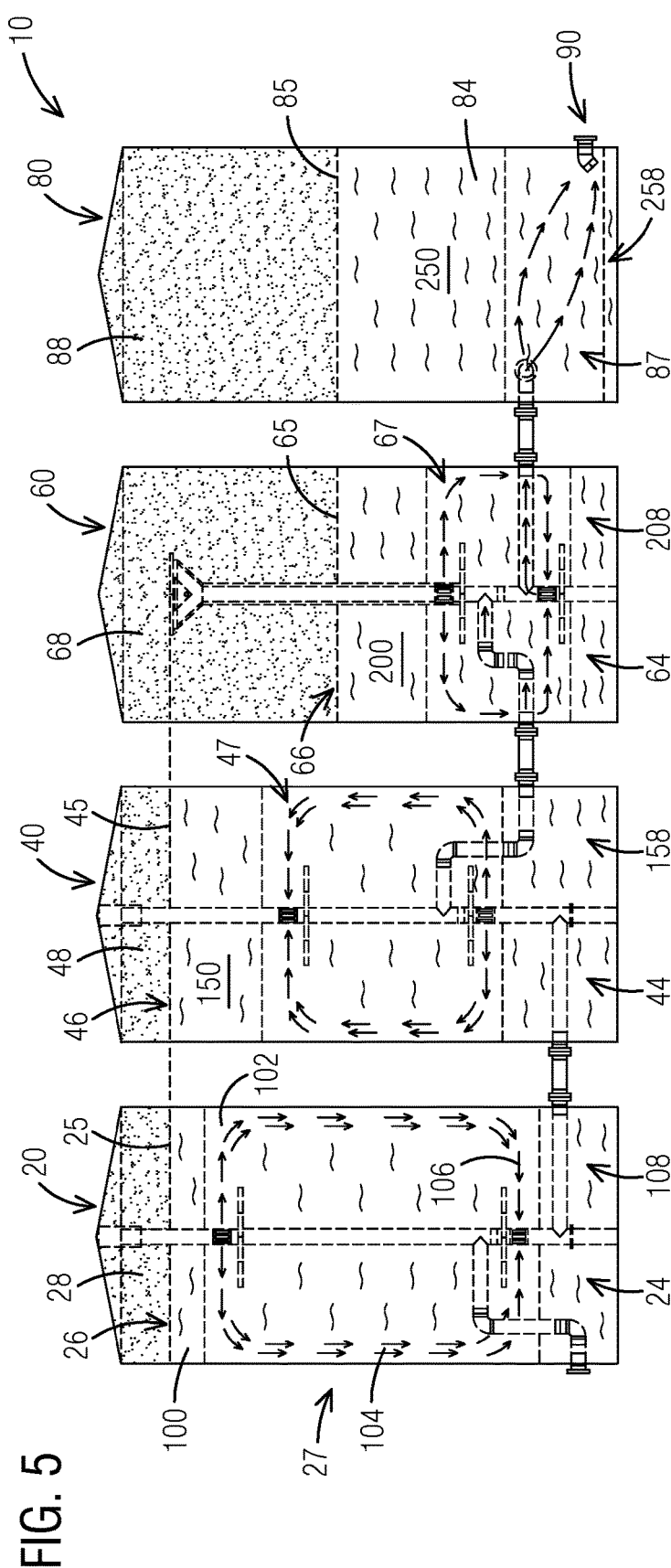
FIG. 5 is a schematic side view of the interior of the all-gravity multi-phase fluid separation system of FIG. 3, showing the fluid flow and circulation patterns within the tanks of the separation system.

FIGS. 4-5 together illustrate the interior of the all-gravity multi-phase fluid separation system 10 of FIG. 3, showing the overall fluid flow and slow circulation patterns 27, 47, 67, 87 that can be established within the individual separation tanks 20, 40, 60, 80, respectively, of the separation system 10. The controlled or predetermined patterns of slow fluid circulation 27, 47, 67, 87 are generally established and maintained within the central or mid-section portions of the water or liquid columns 24, 44, 64, 84 that are defined by the cylindrical sidewalls 22, 42, 62, 82 of the separation tanks. Limiting the slow circulation patterns 27, 47, 67, 87 to the central portions of the liquid columns 24, 44, 64, 84 can further serve to establish and maintain upper quiet zones 100, 150, 200, 250 and lower quiet zones 108, 158, 208, 258 within liquid columns 24, 44, 64, 84 located above and below the slow circulation patterns, respectively.

Together, the slow circulation patterns 27, 47, 67, 87, the upper quiet zones 100, 150, 200, 250, and the lower quiet zones 108, 158, 208, 258 within the liquid columns 24, 44, 64, 84 are configured to greatly reduce or eliminate any turbulence with each liquid column, thereby providing for improved separation of oil and particulate matter from the water to very low levels as the multi-phase fluid progresses through the separation system 10. The slow circulation patterns and the upper and lower quiet zones also together provide sufficient transition and dwell time within the liquid columns 24, 44, 64, 84 that allow hydrocarbon vapors to naturally bubble out at atmospheric pressure from the multi-phase fluid during its passage through the separation system 10, for capture within the gas spaces 28, 48, 68, 88 at the upper ends of the separation tanks 20, 40, 60, 80 and eventual removal through a gas collection system (not shown).

Also shown in FIG. 5 are the surface levels 25, 45, 65, 85 of the liquid columns 24, 44, 64, 84 within each of the separation tanks 20, 40, 60, 80. As described in more detail below, the liquid levels 25, 45 in the first and second tanks 20, 40 can be identical and set or fixed by the height of the upper end of a "Pour-Over" riser in the third tank. The liquid levels 65, 85 in the third and fourth tanks 60, 80 can also be identical; however, in these tanks the liquid levels 65, 85 can be variable, and can be regulated by a controllable outlet valve or by an outlet pump (not shown) taking suction from the clear water outer 90 of the fourth tank 80.

Figure 6:
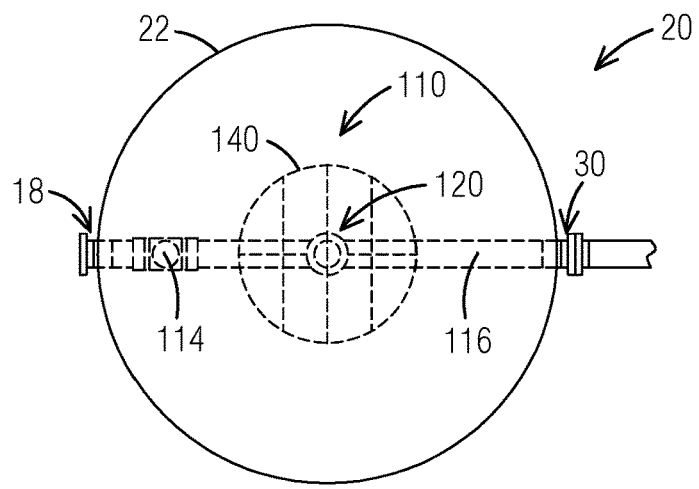
FIG. 6 is a top view of the interior of the first tank of the multi-phase fluid separation system of FIG. 1.
Figure 7:
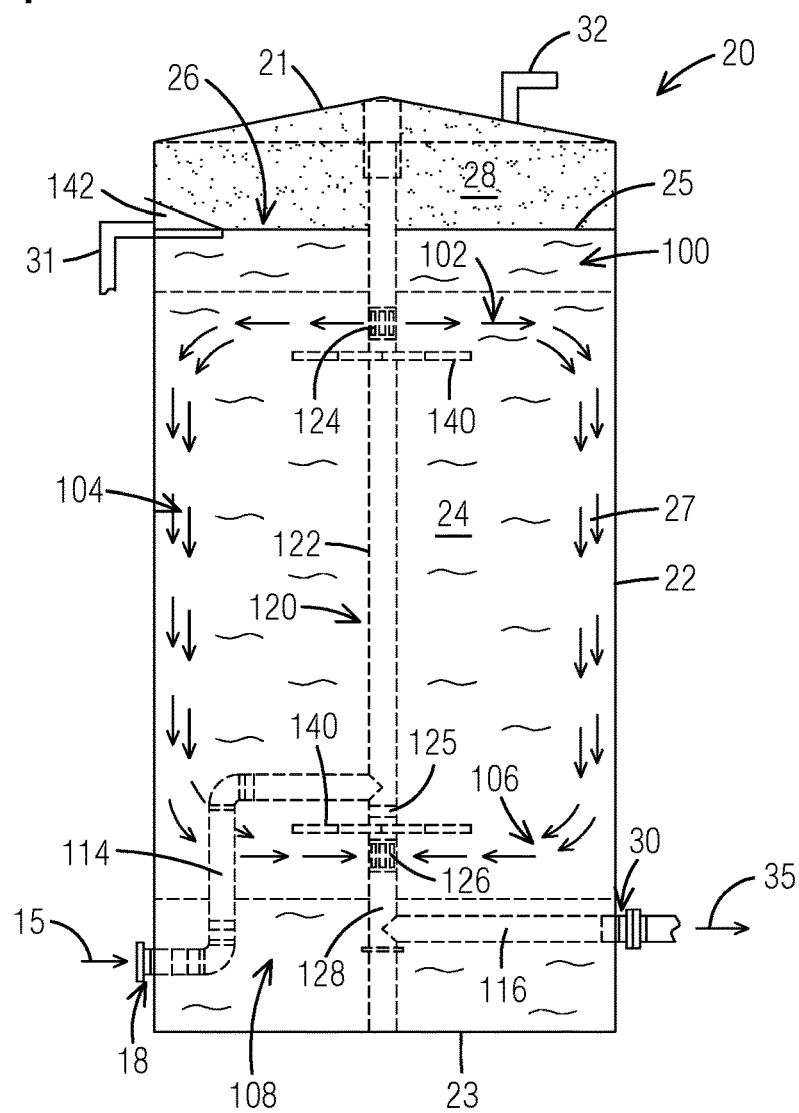
FIG. 7 is a schematic side view of the interior of the first tank of the multi-phase fluid separation system of FIG. 1, showing both the internal components and the fluid flow and circulation pattern within the tank.

FIGS. 6-7 together illustrate the interior of the first tank 20, also known as the inlet tank, of the multi-phase fluid separation system 10, showing both the internal components 110 and the overall fluid flow and circulation pattern 27 within the tank. The inlet tank can receive the inlet stream 15 of multi-phase or produced fluid from a gathering header or manifold. If needed, a booster pump can be used to force the inlet stream 15 of multi-phase fluid into the inlet tank 20 and up the first center riser 120 to the submerged radial outflow ports 124, after which gravity flow is used to naturally move the multi-phase fluid (comprising mostly the water component) between the tanks of the separation system 10.

The internal components 110 of the inlet or first tank 20 include a 'distribution-over-gathering' center riser 120 that may comprise a large diameter pipe (about 12") which directs the primary stream of the multi-phase fluid passing therethrough at a low velocity. The center riser 120 may be secured in a vertical orientation within the center portion of the tank 20 and aligned with the tank's center vertical axis. In one aspect the center riser 120 may be secured to the bottom 23 and top 21 of the tank 20 to avoid lateral supports through the liquid column 24 that might disturb the predetermined circulation pattern 27. The center riser 120 can further comprise a combined 'distribution-over-gathering' riser pipe, with a distribution section 122 having radial outflow ports 124 located above a gathering section 128 having radial inflow ports 126, with the distribution section 122 and the gathering section 128 being separated by a plug 125. The radial outflow ports 124 can be spaced-apart apertures that are located in the upper ⅓ of the tank height (for example, at about 23', or 276" above grade or bottom 23 of the tank 20), and which are submerged below the surface 25 of the liquid column 24 of the first tank 20. The radial inflow ports 126 can also comprise spaced-apart apertures, and can be located in the lower ⅓ of the tank height (e.g. about 6', or 76" above grade), resulting in a vertical distance of about 17' between the outflow ports 124 and the inflow ports 126. The spaced-apart apertures forming the radial outflow ports 124 and the radial inflow ports 126 can be longitudinal slots, round holes, oblong holes, or other shapes, and in one aspect can be uniformly spaced around the circumference of the center riser 120. It will nevertheless be appreciated that other configurations, shapes, spacing's, and locations for the radial outflow ports 124 and inflow ports 126 are also possible and considered to fall within the scope of the present disclosure.

The internal components 110 of the inlet or first tank 20 further includes an inlet pipe 114 in fluid communication with the multi-phase fluid or oily water first tank inlet 18, and which can enter through the sidewall 22 of the first tank 20 at about 4' (48") above grade (or working height) and then connect to the center riser 120 above the plug 125, at about the 8' (96") level above grade. The first tank also includes a discharge pipe 116 that can connect to the center riser 120 below the plug 125, at about the 4' above great working height level, and then exit through the sidewall 22 of the tank 20 at about the same 4' working height. Both the inlet pipe 114 and the outlet pipe 116 can comprise the same or similar large diameter pipe (about 12") that directs the primary stream of the multi-phase fluid passing therethrough at a low velocity.

As shown in the drawings, the inlet or first tank 20 can further include flow distributor plates 140 located both below the radial outflow ports 124 and above the radial inflow ports 126. The upper distributor plate 140 can force the inlet fluid to flow radially outward toward the cylindrical sidewalls 22 of the first tank 20 to establish the fluid circulation pattern 27, and with both the upper and lower distributor plates 140 serving to prevent a short-circuiting of the fluid flow path between the radial outflow ports 124 and the radial inflow ports 126.

The internal components 110 of the inlet or first tank 20 can also include an oil gathering system that is located at the liquid surface 25, and which generally comprises an oil skimmer 142 for capturing the layer of skim oil 26 that accumulates at the surface 25 of the liquid column 24, and then withdrawing the captured skim oil through piping 31 to an external oil storage tank (not shown). In addition, the first tank 20 may also include an internal online solids removal system (also not shown, but described in more detail below) located in the lower portion of the tank 20 near the tank bottom 23, and which can provide for any accumulated solids (particulate matter) and sludge (paraffin's, dense liquids) to be periodically removed without interrupting the continuous operation of the separation system 10.

Also shown in drawings, the inlet or first tank 20 generally includes a connection or outlet 32 at the top 21 of the tank for a hydrocarbon gas gathering system that withdraws the hydrocarbon gases or vapors from the gas space 28 located at the upper end of the separation tank 20 above the liquid column 24, and which can connect to a common gas gathering header or optionally to supplemental tank vents.

With continued reference to FIG. 7, in one aspect the level 25 of the liquid column 24 can be set at 320" (26', 8") during operation of the separation system 10, with the surface level being set or defined by the upper end of the pour-over riser 220 located in the third tank 60. In this configuration the radial outflow ports 124 can be submerged more than 3' below the surface 25 of the liquid column 24. As shown in the drawing the first fluid circulation pattern 27 can comprise a first radial outflow leg 102 that extends radially outward from the distribution section outflow ports 124 to the inner surfaces of the tank sidewalls 22, followed by a second downflow leg 104 that extends vertically downward along tank sidewalls. The downflow leg 104 can include about 17' of downward vertical travel, with the downward motion providing improved separation of the solids and sludge components from the liquid water component as the multi-phase fluid turns radially inward at the third inflow leg 106 to flow radially inward from the tank sidewalls 22 to the gathering section radial inflow ports 126. Locating the radial outflow leg 102 within the liquid column 24 at a level substantially below the level 25 of the surface further serves to establish an upper quiet zone 100 above the riser outflow ports 124 that allows the oil component to gently separate from the water component and migrate toward the surface 25 of the liquid column 24, to accumulate as a layer of skim oil 26. Similarly, locating the radial inflow leg 106 at a level substantially above the bottom 23 of the tank 20 further serves to establish a lower quiet zone 108 below the riser inflow ports 126 that allows for heavy sludge and solids to gently settle toward the tank bottom 23.

It will thus be appreciated that during operation of the separation system 10 that the separation processes are initially established within the first or inlet tank 20, with the hydrocarbon vapor bubbling upward to the gas pocket 28 located between the liquid surface 25 and the tank top 21, the entrained oil separating from the water and migrating upward to the liquid surface 25 to form a layer of skim oil 26, solids (particulate matter) and sludge (paraffin's, dense liquids) migrating downward toward the tank bottom 23, and the remainder of the multi-phase fluid entering the gathering section 128 of the center riser 120 through the radial inflow ports 126, and then flowing outward through the discharge pipe 116 and the tank outlet 130 as a partially-clean primary stream 35 of multi-phase fluid.

While the design and construction of the first inlet tank 20 may be optimized to initiate the separation processes described above, it is nevertheless foreseen that the construction of the center riser of the first tank can be modified so that gathering section is above the distribution section, resulting in a reversal of the direction of flow of the first fluid circulation pattern, and that other arrangements of the center riser and the riser outflow and inflow ports, so as to establish additional or different circulation patterns within the first liquid column, are also possible and considered to fall within the scope of the present disclosure.

Figure 8:
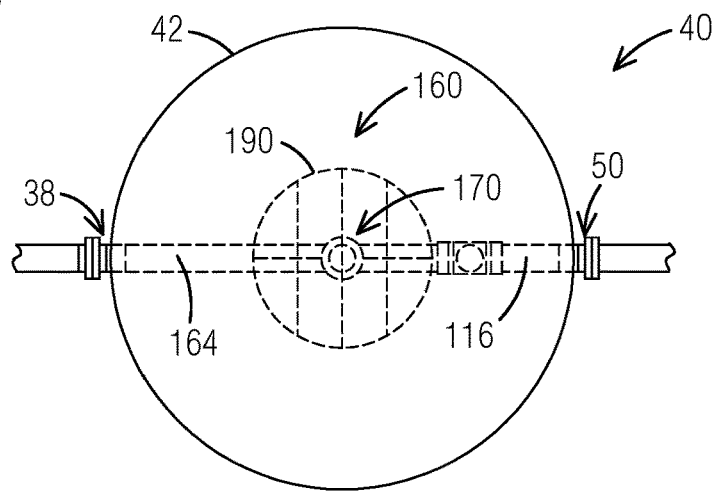
FIG. 8 is a top view of the interior of the second tank of the multi-phase fluid separation system of FIG. 1.
Figure 9:
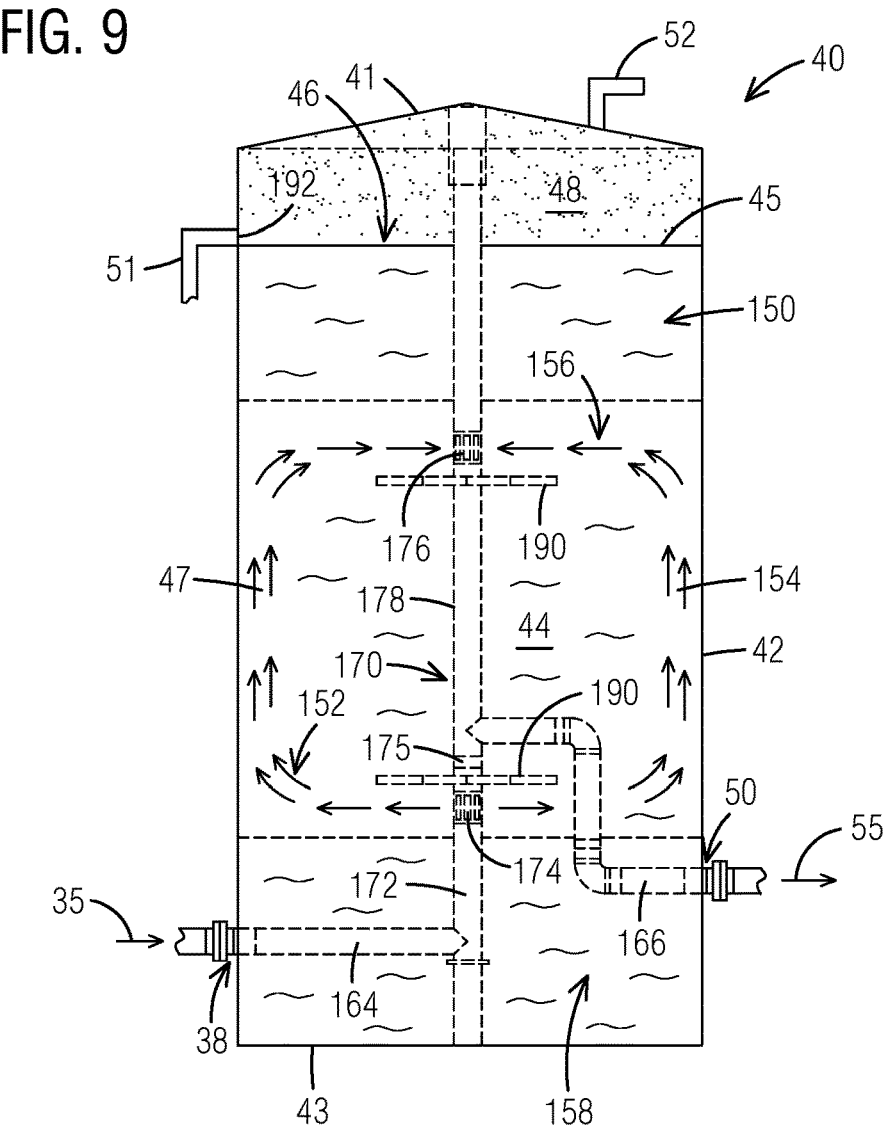
FIG. 9 is a schematic side view of the interior of the second tank of the multi-phase fluid separation system of FIG. 1, showing both the internal components and the fluid flow and circulation pattern within the tank.

FIGS. 8-9 together illustrate the interior of the second tank 40, also known as the first separation tank, of the multi-phase fluid separation system 10, showing both the internal components 160 and the overall fluid flow and circulation pattern 47 within the second tank 40. As noted above, it is understood that after first entering the separation system 10 through the center riser 120 of the first tank 20, that the primary stream of the multi-phase or mixed fluid flows naturally under gravity through the separation system 10 at a rate necessary to maintain liquid level equilibrium in the first two tanks 20, 40 and the pour-over center riser of the third tank 60. Thus, the second tank 40 receives the partially-clean primary stream 35 of multi-phase fluid from the first tank 20, without forced flow, through an inlet pipe 164 that is in fluid communication with the second tank inlet 38. In one aspect the inlet pipe 164 can enter through the sidewall 42 of the second tank 40 at about the 4' (48") above grade working height level, and extend radially inwardly to connect with the center riser 170 also at the 4' working height level, which can be below the plug 175 of the center riser 170 of the second tank 40.

The internal components 160 of the second tank 40 generally include a 'gathering-over-distribution' center riser 170, also comprising a large diameter pipe (about 12") which directs the mixed fluid passing therethrough at a low velocity. The center riser 170 may be secured in a vertical orientation within the center portion of the second tank 40 and aligned with the tank's center vertical axis. In one aspect the center riser 170 may be secured to the bottom 43 and top 41 of the tank 40 to avoid lateral supports through the liquid column 44 that might disturb the predetermined circulation pattern 47. The center riser 170 can further comprise a combined 'gathering-over-distribution' riser pipe, with a distribution section 172 having radial outflow ports 174 that are located below a gathering section 178 having radial inflow ports 176, with the distribution section 172 and gathering section 178 being separated by a plug 175. In this configuration the radial outflow ports 174 can be located in the lower ⅓ of the tank height (about 8', or 96"), while the radial inflow ports 176 can be located in the upper ⅓ of the tank height (about 23', or 276"), with a vertical distance of about 15' between the outflow ports 174 and the inflow ports 176. In other aspects the radial outflow ports 174 and the radial inflow ports 176 of the center riser 170 can be similar to those found on the center riser 120 of the first tank 20.

The second tank 40 also includes a discharge pipe 166 that can connect to the center riser 170 above the plug 175 at about the 10' (120") level, and then exit through the sidewall 42 of the tank 40 at about the 4' (48") working height level. As with the center riser 170, both the inlet pipe 164 and the outlet pipe 166 of the second tank 40 can comprises the same or similar large diameter pipe (about 12") that directs the mixed fluid passing therethrough at a low velocity.

As shown in FIG. 9, the second tank 40 can further include flow distributor plates 190 located both above the radial outflow ports 174 and below the radial inflow ports 176. The lower distributor plate 190 can force the mixed fluid to flow radially outward toward the cylindrical sidewalls 42 of the second vessel 40 to establish the fluid circulation pattern 47, and with both the lower and upper distributor plates 190 serving to prevent a short-circuiting of the fluid flow path between the lower outflow ports 174 and the upper inflow ports 176.

The internal components 160 of the second tank 40 also generally include an oil gathering system that is located at the liquid surface 45, and which in one aspect can be a simple side port 192 through the tank wall 42 with connection to a skim oil pipe 51. In other aspects the second tank 40 can include a skimmer apparatus similar to that included in the first tank described above. The second tank 40 may also include an internal online solids removal system (not shown, but described in more detail below) located in the lower portion of the tank 40 near the tank bottom 43, and which can provide for any accumulated solids (particulate matter) and sludge (paraffin's, dense liquids) to be periodically removed without interrupting the continuous operation of the separation system 10. The second tank 40 also generally includes a connection or outlet 52 at the top 41 of the tank for a hydrocarbon gas gathering system that withdraws the hydrocarbon gases or vapors from the gas space 48 located at the upper end of the separation tank 40 above the liquid column 44, and which can connect to a common gas gathering header or optionally to supplemental tank vents.

As described above, the surface level 45 of the liquid column 44 of the second tank 40 is generally equal to the surface level 25 of the liquid column 24 of the first tank 20 (for example, 320" (26', 8")) during operation of the separation system 10, with the surface level being defined at the upper end of the pour-over riser 220 located in the third tank 60. With continued reference to FIG. 9, the second fluid circulation pattern 47 can comprise a first radial outflow leg 152 that extends radially outward from the distribution section outflow ports 174 to the inner surfaces of the tank sidewall 42, followed by a second upflow leg 154 that extends vertically upward along the tank sidewalls. The upflow leg 154 can include about 15' of upward vertical travel, with the upward motion providing improved separation of the light solids from the liquid water component as the mixed or multi-phase fluid turns radially inward at the third inflow leg 156 to flow radially inward from the tank sidewalls 42 to the gathering section radial inflow ports 176. Similar to the circulation pattern in the first tank 20, locating the radial inflow leg 156 within the liquid column 44 at a location that is substantially below the level of the liquid surface 45 further serves to establish an upper quiet zone 150 above the riser inflow ports 176 that allows the oil component to gently separate from the water component and migrate toward the surface 45 of the liquid column 44, to accumulate as another layer of skim oil 46. Likewise, locating the radial outflow leg 152 at a level substantially above the bottom 43 of the tank 40 further serves to establish a lower quiet zone 158 below the riser outflow ports 174 that allows for heavy sludge and solids to gently settle toward the tank bottom 43.

It will thus be appreciated that during operation of the separation system 10 that the separation processes initially established within the first tank 20 can continue within the second tank 40, with the hydrocarbon vapor bubbling upward to the gas pocket 48 located between the liquid surface 45 and the tank top 41, the entrained oil separating from the water and migrating upward to the liquid surface 45 to form a layer of skim oil 46, solids (particulate matter) and sludge (paraffin's, dense liquids) migrating downward toward the tank bottom 43, and the primary stream of the multi-phase fluid entering the gathering section 178 of the center riser 170 through the radial inflow ports 176, and then flowing downward and outward through the discharge pipe 166 and the tank outlet 150 as a substantially-clean primary stream 55 of multi-phase fluid.

Figure 10:
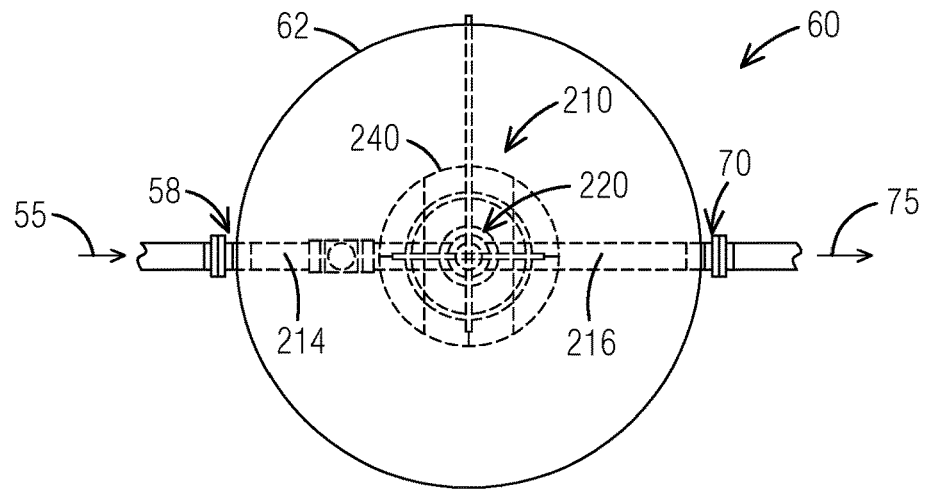
FIG. 10 is a top view of the interior of the third tank of the multi-phase fluid separation system of FIG. 1.
Figure 11:
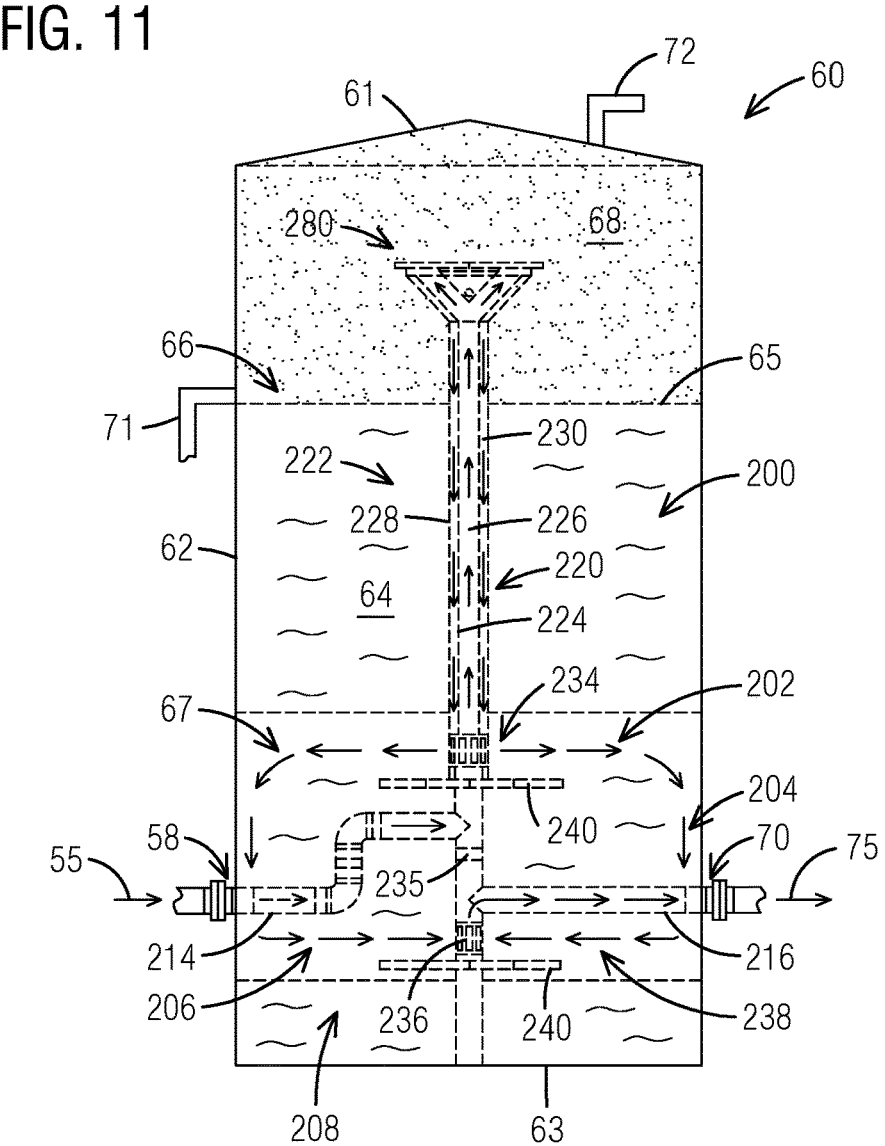
FIG. 11 is a schematic side view of the interior of the third tank of the multi-phase fluid separation system of FIG. 1, showing both the internal components and the fluid flow and circulation pattern within the tank.

FIGS. 10-11 together illustrate the interior of the third tank 60, also known as the second separation tank, of the multi-phase fluid separation system 10, showing both the internal components 210 and the overall fluid flow and circulation pattern 67 within the third tank 60. The third tank 60 receives the substantially-clean primary stream 55 of the multi-phase fluid from the second tank 40, without forced flow, through an inlet pipe 214 that is in fluid communication with the tank inlet 58. In one aspect the inlet pipe 214 can enter through the sidewall 62 of the third tank 60 at about the 4' (48") above grade working height level, and extend radially inwardly and upwardly to connect with the center riser 220 at about the 8' (96") level, which is above a plug 235 that separates an upper distribution section 222 from a lower gathering section 238. As with center risers in the first and second tanks, the 'gathering-over-distribution' riser 220 of the third tank 60 can comprise a large diameter pipe (about 12") which directs the primary stream of the multi-phase fluid passing therethrough at a low velocity, and may also be secured in a vertical orientation within the center portion of the third tank 60 and aligned with the tank's center vertical axis.

Figure 16:
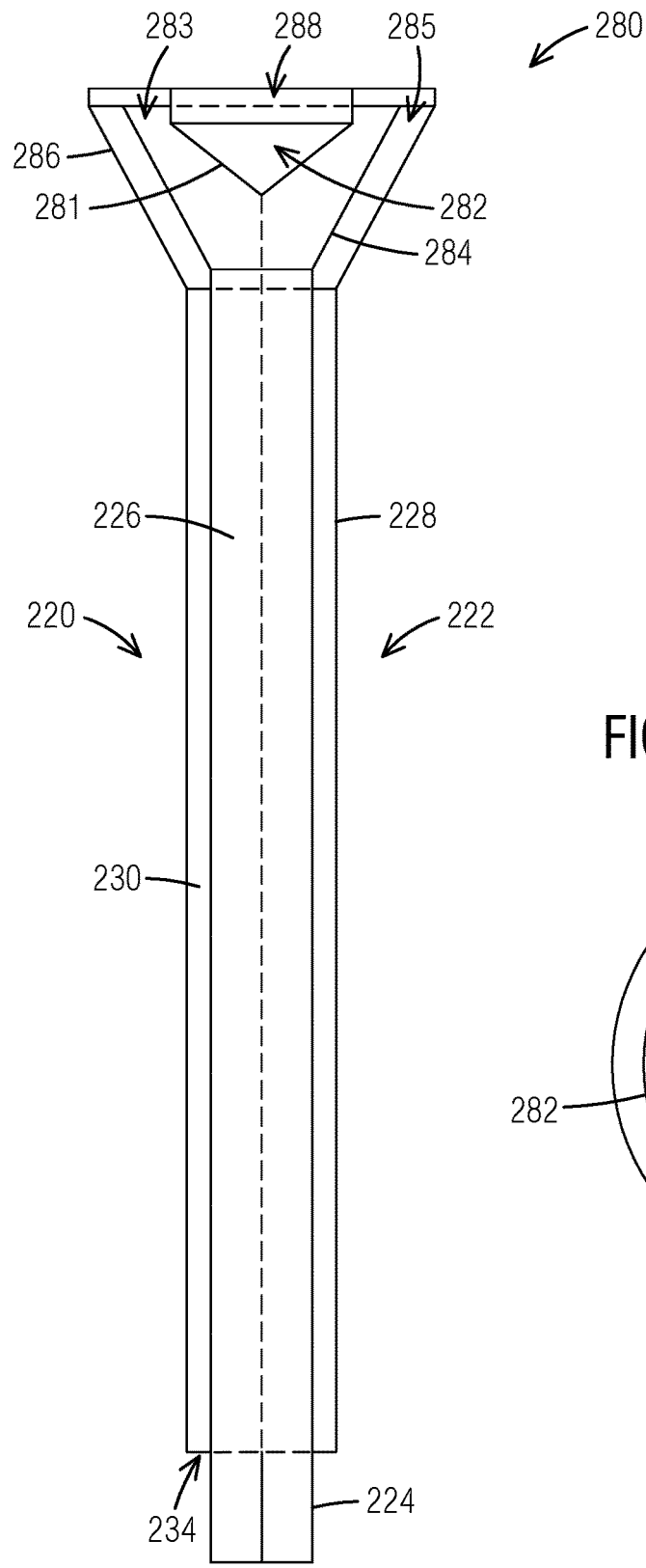
FIG. 16 is a close-up side view of the upper portion of the pour-over center riser and tulip assembly of the third tank of the multi-phase fluid separation system shown in FIG. 11.

The center riser 220 of the third tank 60 is distinguishable from the center risers of the first and second tanks, however, for having a distribution section 222 above the gathering section 238 that has been modified to include a "pour-over" pipe-within-pipe configuration. In particular, the distribution section 222 includes a vertical pipe-within-pipe configuration, with a vertical inner pipe 224 in fluid communication with the third tank inlet pipe 214 and defining an upwardly-extending central passage 226. The vertical inner pipe 224 is surrounded by a vertical outer pipe 228 that defines an outer annular passage 230 or down corner having a lower end that further defines, or is in fluid communication with, a riser outflow port 234. Since the riser outflow port 234 is in fluid communication with the outer annular passage 230, rather than with the tubular central passage 226, in one aspect the riser outflow port 234 is a single, downwardly-opening annular aperture, as shown in FIG. 16. In other embodiments the center riser can include a plurality of radial outflow ports (spaced-apart apertures) formed through the outer pipe above a barrier that closes the lower end of the annular passage, as shown in FIG. 11. In the embodiment of the third tank center riser 220 of the separation system 10 shown in FIGS. 10-11, the "pour-over" riser 220 further includes a tulip oil skim apparatus 280 at an upper end, which will be discussed in more detail below.

Figure 14:
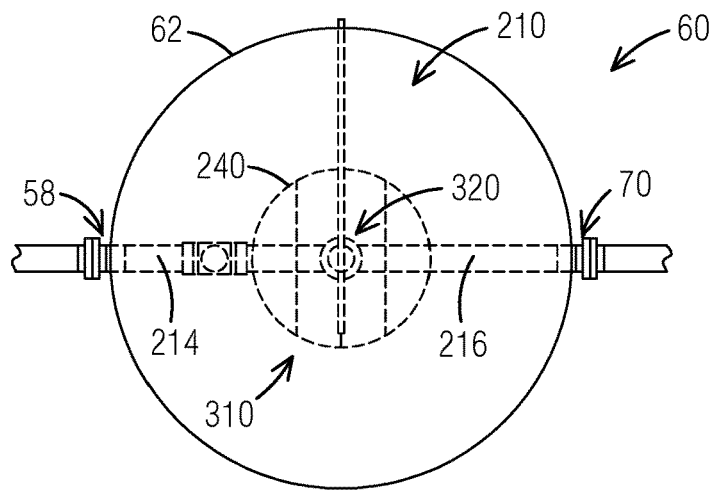
FIG. 14 is a top view of the interior of the third tank, in accordance with another representative embodiment of the multi-phase fluid separation system of the present disclosure.
Figure 15:
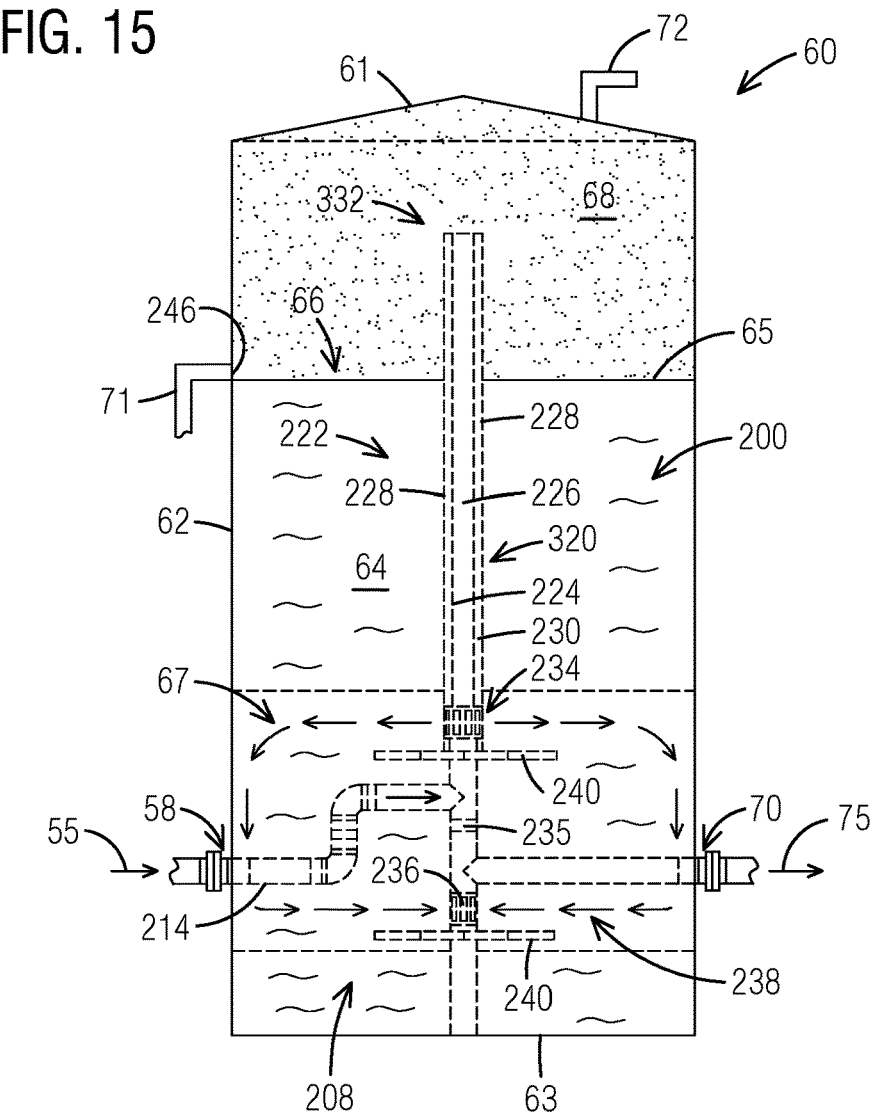
FIG. 15 is a schematic side view of the interior of the third tank showing both the internal components and the fluid flow and circulation pattern within the tank, in accordance with the multi-phase fluid separation system of FIG. 14.

With brief reference to FIGS. 14-15 for discussion purposes, illustrated therein is an alternative embodiment of the "pour-over" center riser 320 for the third tank 60 that does not include the tulip oil skim apparatus of FIGS. 10-11. In this more basic design the vertical inner pipe 224 and the vertical outer pipe 228, together in the vertical pipe-within-pipe configuration, extend upwardly to a define a simple pour-over opening 332 that can be substantially horizontally-aligned, in that the upper ends of both the central passage 226 and the outer annular passage/down corner 230 are located at substantially the same height. This allows for the upwardly-rising inlet fluid to "pour-over" the upper edge of the inner pipe 224 and down into the outer annular passage 236 without flowing radially outward beyond the upper edge of the outer pipe 228. As discussed above, the upper edge of the inner pipe 224 may be located at about the 320" (26', 8") level, which serves to define the surface height 25, 45 of the liquid columns 24, 44 in the first and second tanks 20, 40, respectively, at substantially the same level.

Further shown in FIG. 15, the surface level 65 of the liquid column 64 of the third tank 60 is generally located between the upper pour-over opening 332 and the riser outflow port 234, so that the 'pour-over' fluid drops into the liquid column 64 of the third tank 60 while still within the outer annular passage 230, and then continues to flow downward and ultimately outward into the liquid column 64 through the riser outflow port 234. Entering the liquid column 64 of the third tank 60 while still within the outer annular passage 230 serves to eliminate splashing and reduce turbulence.

With reference to FIGS. 11 and 15, the "pour-over" center riser 220, 320 of the third tank 60 further includes a gathering section 238 with radial inflow ports 236 located below and separated from the pipe-within-pipe distribution section by a plug 235. The radial inflow ports 236 can located in the lower ⅓ of the tank height (at about 4', or 48") with about 8' vertical distance between annular outflow port 234 and radial inflow ports 236. In other aspects the outflow port(s) 234 and the radial inflow ports 236 of the "pour-over" center riser 220, 320 can be similar to those found on the center risers 120, 160 of the first and second tanks 20, 40.

The third tank 60 also includes a discharge pipe 216 that can connect to the "pour-over" center riser 320 below the plug 235, at about the 6' (72") level, and then extend radially outward to exit through the sidewall 62 of the third tank 60 also at about the 6' (72") level. As with the center riser 320, both the inlet pipe 214 and the discharge pipe 216 can comprise the same or similarly large diameter (about 12") pipe that directs the primary stream of the multi-phase fluid passing therethrough at a low velocity.

As shown in the drawings, the third tank 60 can further include a first flow distributor plate 240 located below the annular outflow port 234 to prevent a short-circuiting of the fluid flow path between the upper outflow port 234 and the lower inflow ports 236, and a second flow distributor plate 240 located below the radial inflow ports 236 to prevent the fluid flow path of the nearly-clean multi-phase fluid from approaching the bottom 63 of the tank 60.

The internal components 210 of the third tank 60 may also include an oil gathering system that is located at the liquid surface 65, and which in one aspect can be a simple side port 242 through the tank wall 62 with connection to a skim oil pipe 71. In other aspects the third tank 60 can include a skimmer apparatus similar to that included in the first tank described above. The third tank 60 also generally includes a connection or outlet 72 at the top 61 of the separation tank for a hydrocarbon gas gathering system that withdraws the hydrocarbon gases or vapors from the gas space 68 located at the upper end of the separation tank 60 above the liquid column 64, and which can connect to a common gas gathering header or optionally to supplemental tank vents.

With reference back to FIGS. 10-11, the "pour-over" center riser 220 of the separation system 10 is comparable to the center riser 320 of FIGS. 14-15 except for the addition of the tulip oil skim apparatus 280 at an upper end of the vertical pipe-within-pipe configuration, in place of the simple pour-over opening 332 described above.

Figure 17:
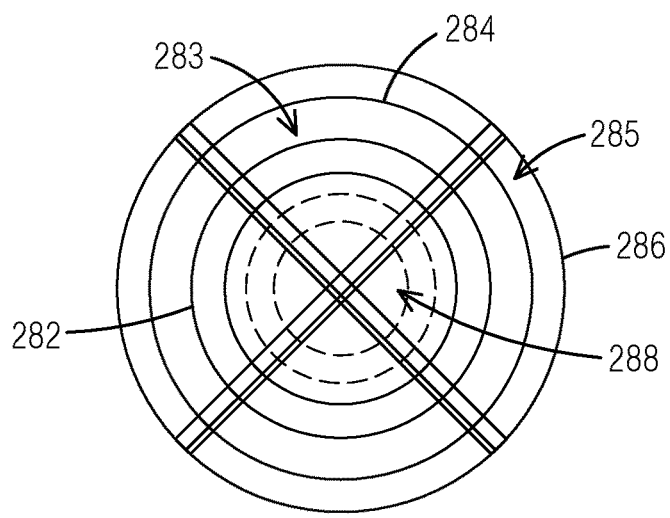
FIG. 17 is a close-up top view of the upper portion of the pour-over center riser and tulip assembly of the third tank of the multi-phase fluid separation system shown in FIG. 11.

As illustrated in detail in FIGS. 15-17, the multi-conical tulip apparatus 280 includes an inner funnel/inverted cone 282 that functions as an oil skim device and which defines, together with a concentric intermediate funnel/inverted cone 284, an inner upper annular opening 283 that is in fluid communication with the central passage 226 of the inner pipe 224. The intermediate funnel/inverted cone 284, in turn, is surrounded by a concentric outer funnel/inverted cone 286 that defines an outer upper annular opening 285 that is in communication with the outer annular passage/down corner 230 located between the outer pipe 228 and the inner pipe 224. In one aspect the inner concentric funnel 282 can comprise an inverted cone having an angled lower outer surface 281 with a rough texture, such as provided by an attached mesh, that promotes separation and congealing of a skim oil film onto the angled lower outer surface 281. This skim oil film is then pushed up the angled lower outer surface 281 by the upward flow of water until it flows over the upper edge of the inner concentric funnel 282 and into a conical skim oil reservoir 288. The skim oil can then be piped to the external oil storage tank (not shown). The inner upper annular opening 283 of the multi-conical tulip apparatus 280 is substantially horizontally aligned with the outer upper annular opening 285, with both of the upper annular openings being located at about the 320" (26', 8") level to define the liquid surface levels 25, 45 in the first and second tanks 20, 40, as described above.

In contrast to the surface levels 25, 45 of the liquid columns 24, 44 of the first and second tanks 20, 40, the liquid level 65 of the liquid column 64 of the third tank 60 can range between the tulip assembly 280 at the upper end and the annular outflow port 234 of the pour over center riser 220 at the lower end. Moreover, the liquid level 65 is substantially equal with the liquid level 85 of the fourth tank 80, which in turn is controlled by a level switch and an outlet pump that maintains the fluid levels 65, 85 in the third and fourth tanks 60, 80 in the predetermined range so as to provide sufficient suction head for the pump while preventing tank overflow.

With reference back to FIGS. 11 and 15, the third fluid circulation pattern 67 can comprise a first radial outflow leg 202 that extends radially outward from the distribution section outflow port 234 to the inner surfaces of the tank sidewall 62, followed by a second downflow leg 204 that extends vertically downward along the tank sidewalls. The downflow leg 204 can include about 8' of downward vertical travel, with the downward motion providing a final separation of any residual solids from the liquid water component as the nearly-clean fluid turns radially inward at the third inflow leg 206 to flow radially inward from the tank sidewalls 62 to the gathering section radial inflow ports 236. Similar to the circulation patterns in the first tank 20 and the second tank 40, locating the radial outflow leg 202 within the liquid column 64 at a location that substantially below the surface 65 further serves to establish an upper quiet zone 200 above the riser outflow port 234 that allows the oil component to gently separate from the water component and migrate toward the surface 65 of the liquid column 64, to accumulate as another layer of skim oil 66. Likewise, locating the radial inflow leg 206 at a level above the bottom 63 of the tank 60 further serves to establish a lower quiet zone 208 below the riser inflow ports 236 and the lower flow distributor plate 240, which allows for any residual sludge or solids to gently settle toward the tank bottom 63.

It will thus be appreciated that during operation of the separation system 10 that the separation processes established within the first and second tanks 20, 40 continues within the third tank 60, with residual hydrocarbon vapor bubbling upward to the gas pocket 68 located between the liquid surface 65 and the tank top 61, residual entrained oil separating from the water and migrating upward to the liquid surface 65 to form a layer of skim oil 66, residual solids (particulate matter) and sludge (paraffin's, dense liquids) migrating downward toward the tank bottom 63, and the nearly-clean primary stream 75 of the multi-phase fluid entering the gathering section 238 of the center riser 220 through the radial inflow ports 236, and then flowing upward and outward through the discharge pipe 216 to the third tank outlet 70.

Figure 12:
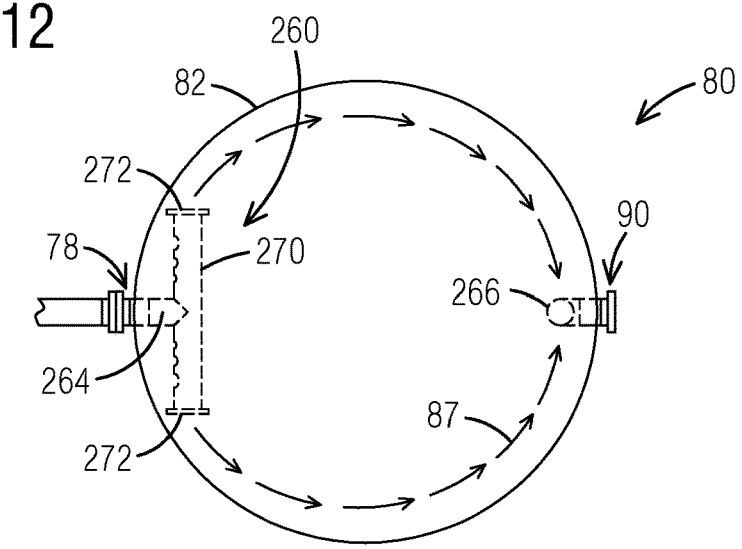
FIG. 12 is a top view of the interior of the forth tank of the multi-phase fluid separation system of FIG. 1.
Figure 13:
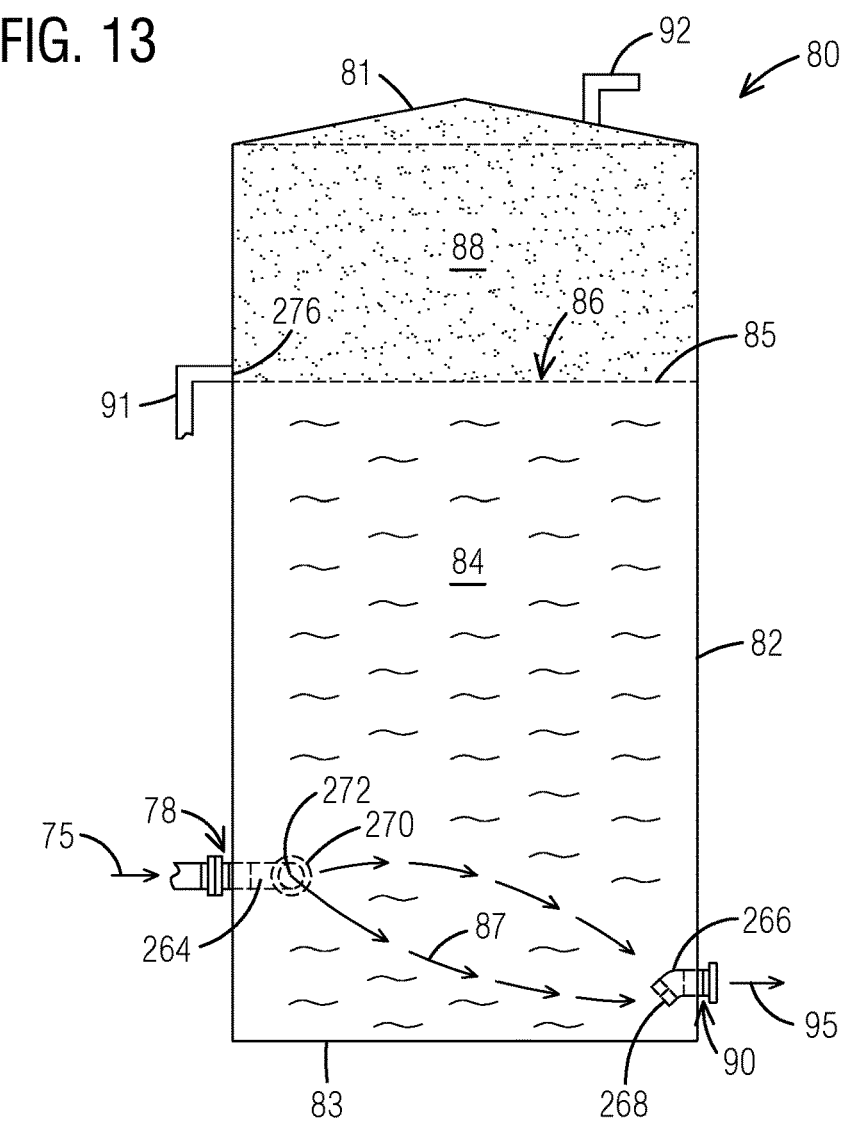
FIG. 13 is a schematic side view of the interior of the forth tank of the multi-phase fluid separation system of FIG. 1, showing both the internal components and the fluid flow and circulation pattern within the tank.

FIGS. 12-13 together illustrate the interior of the fourth tank 80, also known as the outlet tank, of the multi-phase fluid separation system 10, showing both the internal components 260 and the overall fluid flow and circulation pattern 87 within the fourth tank 80. The fourth tank 80 receives the nearly-clean multi-phase fluid from the third tank 60, without forced flow, through an inlet pipe 264 that is in fluid communication with the tank inlet 78. In one aspect the inlet pipe 264 can enter the fourth tank 80 through the sidewall 82 at about the 6' (72") level, and then direct the multi-phase fluid into an inlet diverter device 270 having two large, oppositely directed outflow openings 272 that redirect the fluid flow in opposite directions along the interior surface of the cylindrical sidewall 82 of the fourth tank 80 while minimizing turbulence and reducing fluid flow velocities. In one aspect the inlet pipe 264 and the inlet diverter device 270 may be constructed of a larger diameter pipe (about 12-18") so as to further slow and reduce the velocity of the fluid entering the fourth tank 80. As noted above, the liquid level 85 of the fourth tank 80 is variable, and in one aspect can serve as a buffer volume to better accommodate changes and surges in the initial inlet flow 15 (FIGS. 6-7) into the separation system 10.

The fourth tank 80 can further include an open-ended withdrawal pipe 266 having an inflow opening 268 just inches above the tank bottom 83 to withdraw from the heaviest, cleanest portion of the liquid or water column 84. The clean water can then exit through the sidewall 82 of the fourth tank 80 at about the 4' (48") above grade working height level.

As with the first, second, and third tanks, the internal components 260 of the fourth tank 80 may also include an oil gathering system that is located at or about the highest level of the variable liquid surface 85, and in one aspect can be a simple side port 276 through the tank wall 82 with connection to a skim oil pipe 91. The fourth tank 80 also generally includes a connection or outlet 92 at the top 81 of the separation tank for a hydrocarbon gas gathering system that withdraws the hydrocarbon gases or vapors from the gas space 88 located at the upper end of the separation tank 80 above the liquid column 84, and which can connect to a common gas gathering header or optionally to supplemental tank vents.

As shown in FIG. 13, the fourth fluid circulation pattern 87 comprises a generally circumferential flow along the lower tank sidewalls 82, eventually moving toward the center and downwardly to the discharge pipe inflow opening 268. It is foreseen that other arrangements of the fourth tank internals and the inlet pipe outflow port and the gathering leg inflow ports, so as to establish additional or different circulation patterns within the fourth liquid column, are also possible. It will also be appreciated that the fourth tank can provide for a final separation of contaminants from the clarified produced water, by allowing any residual hydrocarbon vapor to bubble upward to the gas pocket 88 between the liquid surface 85 and the tank top 81, any residual skim oil to separate from the water and flow upward to the fluid surface to form a skim oil layer 86, and any residual light solids drop toward tank bottom 83 for removal during periodic maintenance, although it is not anticipated that anything more than minor amounts of solids or sludge will reach the fourth tank 80 during normal steady-state operating conditions.

With reference back to FIG. 2, the separation system 10 can further include a final filtration and/or water treatment stage 96. In one aspect the final filtration stage may be a common fine-filtration type system having switchable vessels and flushable media filters. It will be appreciated that the final filtration stage may also be optimized per the intended use of clean or clarified water, such as for recycle or disposal. A final chemical treatment of the clean or clarified water is also possible.

As also discussed above, the first and second tanks 20, 40 may include an online solids removal system, which can comprises multiple external pumps that are connected to different sets of internal piping/nozzles located near the bottoms of the tanks. In one aspect the fluid source for the pumps is a side stream of cleaned produced water. During use, a first pump/nozzle apparatus can be activated to induce turbulent flow to the tank bottoms to prepare the solids for removal, after which a second pump/nozzle apparatus may be activated to transfer the solids via a motive fluid to a drain and/or dedicated storage tank.

As indicated above, the all-gravity water clarification system has been described herein in terms of preferred embodiments and methodologies considered by the inventor to represent the best mode of carrying out the invention. It will be understood by the skilled artisan, however, that a wide range of additions, deletions, and modifications, both subtle and gross, may be made by those of skill in the art to the illustrated and exemplary embodiments of the all-gravity multi-phase fluid separation system without departing from the spirit and scope of the present disclosure.

What is claimed is:

1. A separation system for separating the components of a multi-phase fluid, the separation system comprising:
   a first tank comprising:
      an upright and enclosed first tank body defined by a tank bottom substantially at grade, a tank top opposite the tank bottom, and a cylindrical sidewall centered around a first vertical axis and extending upward to the tank top;
      a first riser having a tubular construction and centered on the first vertical axis, the first riser including a first riser outflow port located above a first riser inflow port and a first plug between the first riser outlet and inflow ports to block fluid flow through the first riser;
      a first inlet pipe receiving multi-phase flow from a source of multi-phase fluid, the first inlet pipe entering through the sidewall of the first tank body and being fluidly coupled to the first riser above the first plug; and
      a first discharge pipe fluidly coupled to the first riser below the first plug and exiting through the sidewall of the first tank body;
   a second tank comprising:
      an upright and enclosed second tank body defined by a tank bottom substantially at grade, a tank top opposite the tank bottom, and a cylindrical sidewall centered around a second vertical axis and extending upward to the tank top;
      a second riser having a tubular construction and centered on the second vertical axis, and including a second riser outflow port located below a second riser inflow port and a second plug between the second riser outlet and inlets port to block fluid flow through the second riser;
      a second inlet pipe fluidly coupled to the first discharge pipe, the second inlet pipe entering through the sidewall of the second tank body, and being fluidly coupled to the second riser below the second plug; and
      a second discharge pipe fluidly coupled to the second riser above the second plug and exiting through the sidewall of the second tank body; and
   a third tank comprising:
      an upright and enclosed third tank body defined by a tank bottom substantially at grade, a tank top opposite the tank bottom, and a cylindrical sidewall centered around a third vertical axis and extending upward to the tank top;
      a third riser having a tubular construction and centered on the third vertical axis, the third riser including a pour-over opening at an upper end thereof, a third riser outflow port below the pour-over opening, a third riser inflow port below the third riser outflow port, and a third plug between the third riser outflow and inflow ports to block fluid flow through the third riser;
      a third inlet pipe fluidly coupled to the second discharge pipe, the third inlet entering through the sidewall of the third tank body, and fluidly coupled to the third riser above the third plug; and
      a third discharge pipe fluidly coupled to the third riser below the third plug and exiting through the sidewall of the third tank body,
   wherein a height of a column of multi-phase fluid in each of the first tank and the second tank is substantially equal to the other and determined by a height of the pour-over opening of the third riser, and
   wherein a fluid circulation pattern is established within each column of multi-phase fluid having a radially-outward travel first leg followed by an vertical travel second leg followed by a radially-inward travel third leg, each of the fluid circulation patterns being configured to separate at least one of a gas component, an oil component, and a particulate matter component from a water component of the the multi-phase flow of multi-phase fluid.

2. The separation system of claim 1, wherein the first riser and the second riser are secured to and directly supported by the tank bottoms and the tank tops of the first and second tanks, respectively.

3. The separation system of claim 1, wherein the vertical travel second leg of the fluid circulation pattern in the first tank is in a downward direction.

4. The separation system of claim 1, wherein the vertical travel second leg of the fluid circulation pattern in the second tank is in an upward direction.

5. The separation system of claim 1, further comprising at least one flow distributor plate extending radially outward from the first riser between the first riser outflow and inflow ports and from the second riser between the second riser outflow and inflow ports, to direct the radially-outward travel first legs of the fluid circulation patterns to the cylindrical sidewalls of the first tank and the second tank, respectively.

6. The separation system of claim 5, wherein the at least one flow distributor plate extending radially outward from the first riser further comprises an upper flow distributor plate proximate to and below the first riser outflow port and a lower flow distributor plate proximate to and above the first riser inflow port.

7. The separation system of claim 1, wherein the first and second riser outflow and inflow ports further comprise apertures uniformly spaced around the circumference of the first and second risers, respectively, and having a shape of a round hole or a vertically-aligned longitudinal slot.

8. The separation system of claim 1, wherein the multi-phase fluid further comprises a produced fluid from a hydrocarbon formation comprising water, oil, hydrocarbon gas, and particulate matter.

9. The separation system of claim 8, further comprising a skim oil outlet located at the top surface of each of the columns of multi-phase fluid in each of the first tank and the second tank, respectively, and configured to withdraw the oil away from the columns of multi-phase fluid during operation of the separation system.

10. The separation system of claim 9, the skim oil outlet of the first tank further comprises a skim oil collection apparatus.

11. The separation system of claim 8, further comprising a gas collection outlet located at the tank top of each of the first tank and the second tank, respectively, and configured to withdraw the hydrocarbon gas away each of the first tank and the second tank during operation of the separation system.

12. The separation system of claim 8, further comprising an online solids removal system located proximate the tank bottom of each of the first tank and the second tank, respectively, and configured to transfer collected particulate matter away from the separation system during operation of the separation system.

13. The separation system of claim 1, wherein the upper end of the third riser further comprises a straight pipe-within-pipe configuration defining a substantially vertically-aligned pour-over opening.

14. The separation system of claim 1, wherein the upper end of the third riser further comprises an inverted conical oil skimmer configuration defining a diagonally aligned pour-over opening.

15. The separation system of claim 1, further comprising a fourth tank comprising:

an upright and enclosed fourth tank body defined by a tank bottom substantially at grade, a tank top opposite the tank bottom, and a cylindrical sidewall centered around a forth vertical axis and extending upward to the tank top;

a fourth inlet pipe fluidly coupled to the third discharge pipe, the fourth inlet pipe entering through the sidewall of the fourth tank body and being fluidly coupled to an inlet diverter for directing the multi-phase flow in opposite horizontal directions along an inner surface of the cylindrical sidewall; and a fourth discharge pipe fluidly coupled to a gathering leg taking suction from near the tank bottom and exiting through the sidewall of the fourth tank body.

16. A method for separating components of a produced fluid, with each component defining a different phase, the method comprising:

introducing a flow of the produced fluid into a first tank having a tank bottom, a tank top opposite the tank bottom, a cylindrical sidewall centered around a first vertical axis and extending upward to the tank top, and a first distribution pipe substantially centered on the first vertical axis in an upper portion of a first liquid column of the produced fluid contained within first tank;

distributing the flow of produced fluid from the first distribution pipe radially outward into the first liquid column and toward the cylindrical sidewall of the first tank, while simultaneously withdrawing produced fluid away from the cylindrical sidewall and into a first gathering pipe substantially centered on the first vertical axis in a lower portion of the first liquid column, so as to establish a first circulation pattern within the first liquid column having:

a first leg radially outward from the first vertical axis toward the cylindrical sidewall;

a second leg vertically downward adjacent the cylindrical sidewall; and a third leg radially inward from the cylindrical sidewall toward the first vertical axis;

directing the produced fluid withdrawn from the first liquid column toward a second tank having a tank bottom, a tank top opposite the tank bottom, a cylindrical sidewall centered around a second vertical axis and extending upward to the tank top, and a second distribution pipe substantially centered on the second vertical axis in a lower portion of a second liquid column of the produced fluid contained within the second tank; and distributing the produced fluid from the second distribution pipe radially outward into the second liquid column and toward the cylindrical sidewall of the second tank, while simultaneously withdrawing produced fluid away from the cylindrical sidewall and into a gathering pipe substantially centered on the second vertical axis in a upper portion of the second liquid column, so as to establish a second circulation pattern within the second liquid column having:

a first leg radially outward from the second vertical axis toward the cylindrical sidewall;

a second leg vertically upward adjacent the cylindrical sidewall; and a third leg radially inward from the cylindrical sidewall toward the second vertical axis;

directing the produced fluid withdrawn from the second liquid column toward a third tank having a tank bottom, a tank top opposite the tank bottom, a cylindrical sidewall centered around a third vertical axis and extending upward to the tank top, and a third distribution pipe substantially centered on the third vertical axis in an upper portion of a third liquid column of produced fluid contained within third tank; and flowing the produced fluid over a pour-over opening located at an upper end of the third distribution pipe to establish a height of the first liquid column and the second liquid column.

17. The method of claim 16, further comprising:

distributing the produced fluid from the third distribution pipe radially outward into the third liquid column and toward the cylindrical sidewall of the third tank, while simultaneously withdrawing produced fluid away from the cylindrical sidewall and into a third gathering pipe substantially centered on the third vertical axis in a lower portion of the third liquid column, so as to establish a third circulation pattern within the third liquid column having:

a first leg radially outward from the third vertical axis toward the cylindrical sidewall;

a second leg vertically downward adjacent the cylindrical sidewall; and a third leg radially inward from the cylindrical sidewall toward the third vertical axis.

18. The method of claim 17, further comprising:

directing the produced fluid withdrawn from the third liquid column toward a fourth tank having a tank bottom, a tank top opposite the tank bottom, a cylindrical sidewall centered around a fourth vertical axis and extending upward to the tank top, and an inlet diverter in a lower portion of a fourth liquid column of the produced fluid contained within the fourth tank;

distributing the produced fluid from the inlet diverter in opposite horizontal directions along an inner surface of the cylindrical sidewall of the fourth tank; and withdrawing the produced fluid away from a bottom portion of the fourth liquid column adjacent the tank bottom and into a gathering leg in fluid communication with a discharge pipe.

* * * * *

UNITED STATES PATENT AND TRADEMARK OFFICE
CERTIFICATE OF CORRECTION

PATENT NO. : 11,007,458 B2
APPLICATION NO. : 16/599024
DATED : May 18, 2021
INVENTOR(S) : Bruce D. Johnson It is certified that error appears in the above-identified patent and that said Letters Patent is hereby corrected as shown below:

In the Claims

Claim 1, Column 15, Line 2, delete a duplicate "the" before –multi-phase flow–; and add "the" before –multi-phase fluid–.

Signed and Sealed this
Eighteenth Day of October, 2022

Katherine Kelly Vidal
*Director of the United States Patent and Trademark Office*